Jan. 7, 1941.                C. H. HILL                 2,227,970
                    MOUNTING ELECTRICAL APPARATUS
                   Filed March 16, 1939        2 Sheets-Sheet 2
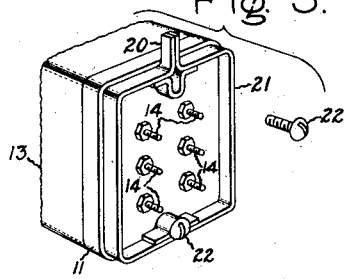
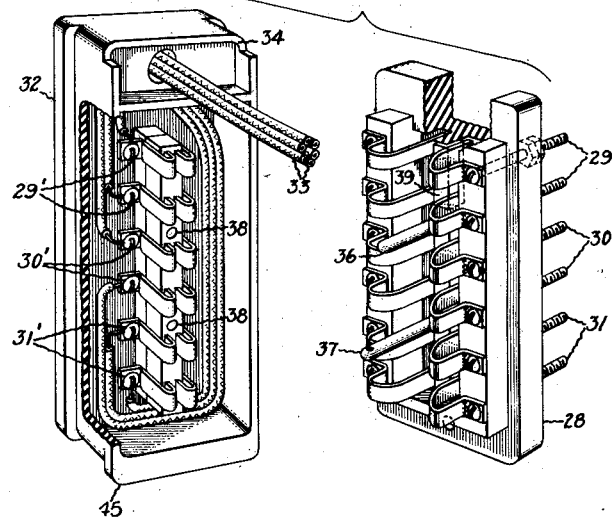
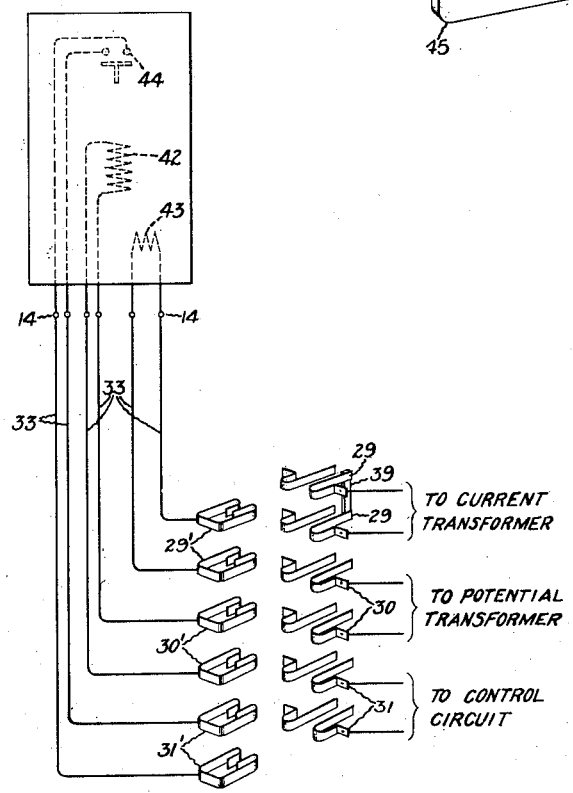
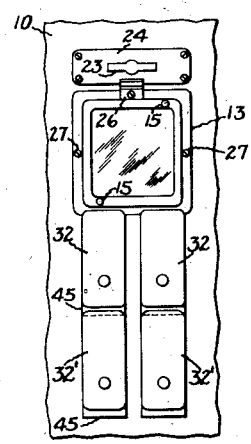
Inventor:
Charles H. Hill,
by *Harry E. Dunham*
His Attorney.

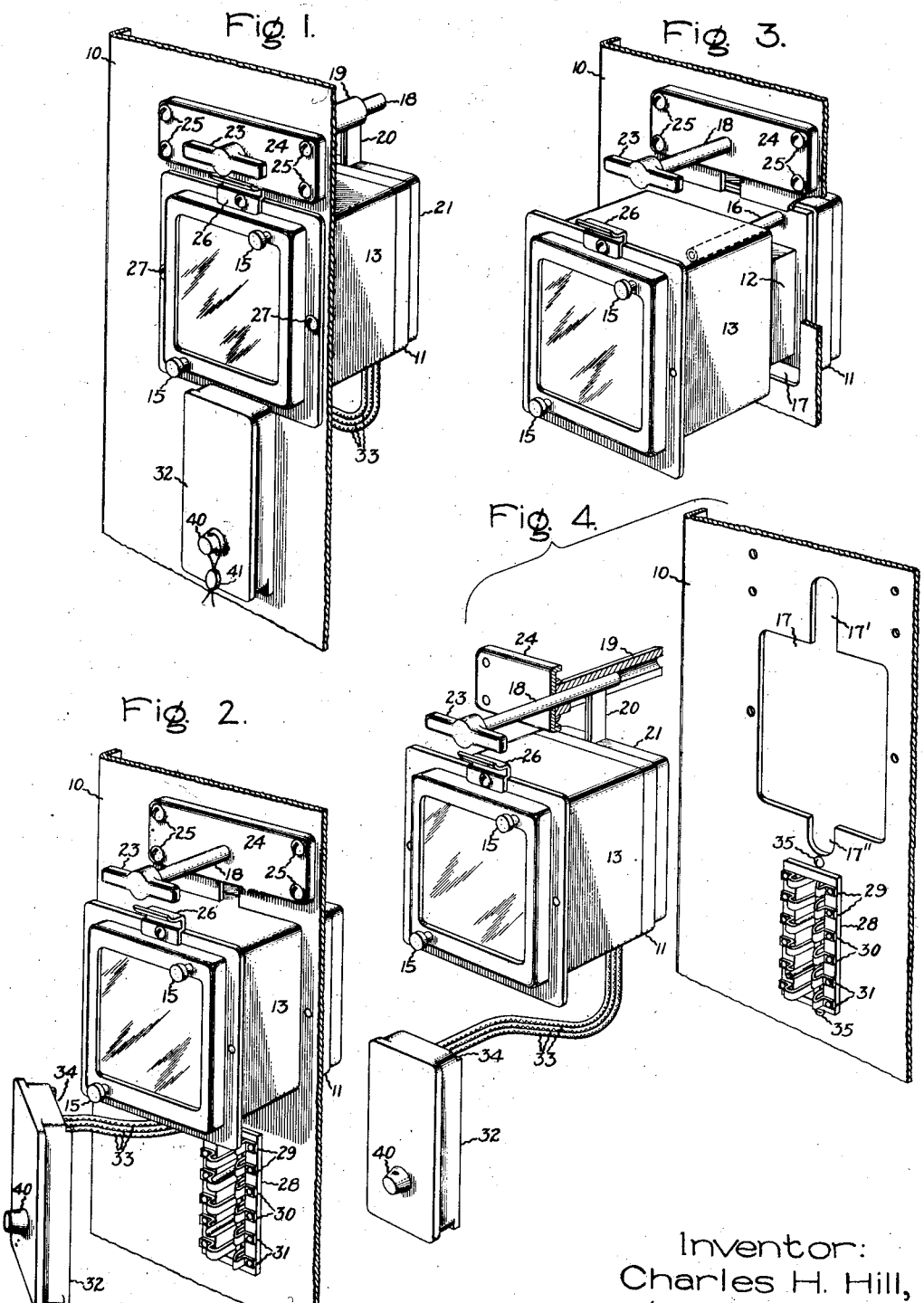

Patented Jan. 7, 1941

2,227,970

UNITED STATES PATENT OFFICE 2,227,970

MOUNTING ELECTRICAL APPARATUS

Charles H. Hill, Drexel Hill, Pa., assignor to General Electric Company, a corporation of New York

REISSUED

Application March 16, 1939, Serial No. 262,226

17 Claims. (Cl. 175—298)

My invention relates to improvements in mounting for electrical apparatus on switchboards and the like, and more particularly flush mounting of relays, meters and the like.

Surface mounting, that is, mounting electrical apparatus on the front of a switchboard is objectionable since differences in size, shape, etc., of the various devices produce an irregular canyonlike effect thereby causing shadows and reduction in visibility.

Moreover, such lack of uniformity would cause some devices to stand out more prominently than others whose functions might be just as important or even more so. However, the devices were partly accessible from the front of the switchboard for inspection, maintenance, and testing, particularly when the switchboard was provided, as shown, for example, in United States Letters Patent No. 1,718,529, dated June 25, 1929, with some form of test block, plug and cover, or the like, suitably coordinated with the device. The desire for better visibility, more uniformity and better appearance resulted in the so-called flush mounting wherein the face or front of the device is substantially in the plane of the switchboard. But, with this mounting, accessibility from the front of the switchboard is practically lost because so much of the device is back of the switch board where it is undesirable, inconvenient and at times dangerous to work. Also with both surface and flush mountings, the necessity for removing several terminal connections in order to remove the device from the switchboard and the precautions necessary to insure the correct subsequent reconnections tends to discourage that degree of inspection, maintenance and testing which such devices should have.

In accordance with my invention, I provide an improved mounting such that the device can be readily withdrawn to the front of the switchboard or completely removed therefrom thereby to preserve all the advantages of flush mounting and yet provide the desired front-of-the-board accessibility for inspection, maintenance, replacement and testing. Also, in accordance with my invention, I provide a mounting such that a device can be quickly and easily replaced by another without danger of false operations and then taken to the laboratory for testing thus reducing, if not entirely eliminating, the necessity for testing on the switchboard and the special equipment required therefor. Further, in accordance with the readily removable feature of my invention, there is no danger of subsequent improper reconnections when the device is replaced thereby encouraging more frequent inspection, maintenance and testing. These and other objects of my invention will appear in more detail hereinafter.

My invention will be better understood from the following description when considered in connection with the accompanying two sheets of drawings, and its scope will be pointed out in the appended claims.

In the accompanying drawings, Fig. 1 illustrates in perspective a flush mounted electroresponsive device embodying my invention with the device in the normal switchboard position; Fig. 2 is similar to Fig. 1 except that it shows the connecting plug or cover removed and the device withdrawn to the front of the switchboard; Fig. 3 is similar to Fig. 2 except that it shows the device casing detached and partially withdrawn; Fig. 4 is similar to Fig. 1 except that it shows the device completely removed from the switchboard; Fig. 5 illustrates in perspective a detail of the device mounting; Fig. 6 illustrates in perspective, with parts broken away for clearness, the connecting plug and terminal block; Fig. 7 is a schematic drawing illustrating connections for a relay device comprising a current winding, a potential winding, and a control circuit; and Fig. 8 is a front elevation of a modification of my invention wherein a device requires more than one terminal block and plug.

The several figures of the drawings exemplify my invention in an electroresponsive device flush mounting on a mounting surface such as a switchboard 10. This mounting is illustrated as comprising a base 11, a body 12, and a casing or cover 13. The switchboard 10 may be of metal or any suitable material, examples of which are well known to the art. The body 12 which constitutes the electroresponsive device is shown only in Fig. 3 and even there only schematically as the specific electroresponsive structure of the device is no part of my invention. The body 12, however, will be understood to include the windings, operating mechanisms, contacts, etc., common to relays, meters and the like. The body 12 is suitably secured to the base 11 which may be provided at the rear, as shown in Fig. 5, with the necessary terminals 14, the number and character of which obviously depend on the type of the device although leads may obviously be used if desired. As shown, the casing 13 is provided with a suitable fastening means, such as thumb screws 15, which, as shown in Fig. 3, engage suitably threaded posts 16 on the base 11.

In accordance with my invention, I provide means insertable from the front of the switchboard 10 through an opening 17 therein for supporting the electroresponsive device for movement through the opening to and from the normal switchboard position, shown in Fig. 1, with the terminals 14 toward the rear of the switchboard. As shown, this supporting means comprises a carriage, such for example as a cylindrical member or rod 18 which is slidably mounted in a tubular guide or pipe member 19. This guide is slotted at the bottom to permit the travel therethrough of the upwardly projecting portion 20 of a support or stirrup 21, which, as shown in Fig. 5, is suitably fastened as by screws 22 to the base 13. The rod 18 is provided with a handle portion 23 for ease in moving the electroresponsive device to its various positions.

In order to have the electroresponsive device readily removable from the front of the switchboard, the tubular guide 19 may be suitably secured, as by welding, to an escutcheon plate 24. This is secured to the front of the switchboard 10 by means operable from the front of the switchboard. For this purpose, there may be used screws 25 which engage threaded holes in the switchboard or nuts suitably secured to the back of the switchboard. In order to permit movement of the device with its support 20 through the opening 17, this opening may be provided with the elongated portion 17'. Since this tends to leave a small uncovered opening in the switchboard between the flange of the casing 13 and the escutcheon plate 24, a small, suitably shaped cover plate 26 may be secured to the flange of the casing 13 to cover this small opening. The electroresponsive device may be secured in the normal switchboard position against movement relatively to the switchboard by means of screws 27 which may either engage the switchboard 10 directly or nuts suitably secured on the rear of the switchboard. While I have shown the movable supporting means for the electroresponsive device as comprising only a single slidable rod 18, it will be obvious to those skilled in the art that, where the weight of the electroresponsive device requires it, additional rods 18 and guide means 19 therefor may readily be provided without departing from the intent and scope of my invention.

In order that the electroresponsive device may be readily removable from the front of the switchboard 10 without disconnecting the wiring and also that it can quickly be replaced without any necessity for wiring at the switchboard, I mount on the switchboard a terminal block 28 shown in more detail in Fig. 6. As shown, this block has terminals 29, 30 and 31 which are connected by wires, respectively, to current and potential transformers and control circuits, etc., not shown but indicated in the schematic diagram of Fig. 7. Cooperating with this block is a plug 32 having terminals 29', 30' and 31' between which and the terminals 14 of the base 11 extend suitable conducting means, such as flexible wires 33, which are movable through an extension 17'' of the opening 17 upon movement of the base 13 through this opening. Thus the plug 32 may be withdrawn from its cooperating block 28, as shown in Fig. 2, so as to deenergize the device to permit working on it while on the switchboard.

However, in order to prevent any possibility of working on the device while alive and the dangers attendant thereon including the possibility of false operations of relays and the like, I may, in accordance with my invention, provide interlocking means between the electroresponsive device and the plug 32. As shown, this means comprises a recessed portion 34 on the plug 32 which overlaps the lower flange of the casing 13 when the electroresponsive device is in the normal switchboard position as more clearly shown in Fig. 1. With this arrangement, obviously there can be no movement of the electroresponsive device until the plug 32 has been disengaged from its block 28. Consequently, when the device is moved, any jar or shock which it may receive during the movement tending to close the contacts, if the device is a relay, cannot produce any false operations of the control circuits.

The block 28 may be mounted from the back of the switchboard through a suitable opening therein and secured in place by suitable means, such as screws 35. Such a construction lends itself suitably to making the plug also in the form of a cover which encloses the contact portion of the block projecting through the board as well as providing a housing for the portion of the wires 33 to the front of the board when the parts are in the normal switchboard position. The block 28 may be provided with suitable guiding means, such as projections or pins 36 and 37 which register with suitable openings 38 in the plug 32. In order to avoid an open current transformer circuit upon removal of the plug, the terminal block 28 may be provided with a short-circuiting bar 39 which bridges the contacts associated with the terminals 29 when the plug 32 is withdrawn therefrom. In those cases requiring a seal for the plug 32, it may have a raised portion 40 which is recessed to receive the guide 37 made sufficiently long for the purpose. Both the knob or raised portion 40 and the guide 37 have registering holes, for example, through which a wire can be placed and sealed by a metallic member 41, as shown in Fig. 1.

Before considering the operation of the embodiment of my invention described, it may be assumed, for example, that the electroresponsive device is a simple single phase circuit-closing power directional relay. Such a relay, as schematically indicated in Fig. 7, would include, as is well known to the art, a potential winding 42, a current winding 43, contacts 44 and a movable operating member. The connections of the windings to the contacts 29', 30' and 31' of the plug 28 through the wires 33 will be obvious from Fig. 7.

If now it be assumed that the relay is in the normal switchboard position, shown in Fig. 1, and that it is desired to examine or make some minor adjustments in the relay, the plug 32 is withdrawn, as shown in Fig. 2, whereupon the relay is completely disconnected from its energizing and control circuits. The relay may then be pulled toward the front of the board, as shown in Fig. 2, and the casing 13 released and slid off, as partially shown in Fig. 3, to give access to the body of the relay without taking it off the switchboard. If the trouble with the relay is something which cannot be attended to while it is on the switchboard, then the screws 25 holding the plate 24 and the device carriage in place on the switchboard may be removed and the whole combination of parts removed from the switchboard, as shown in Fig. 4. The combination thus removed can be immediately replaced by another similar equipment with the steps in a reverse order to the procedure just described and without interfering with the ordinary processes of station operation. Subsequently, the removed combination can be taken to the laboratory or a place where suitable testing sources are available. It can then be repaired, adjusted, tested, or whatever is necessary, to be done to make it ready for service.

A simple electrical device, such as the relay just described, may require only a single plug 32 and block 28. On the other hand, a more complicated device, such for example as a distance relay or a polyphase power directional relay or a polyphase meter, may require more terminals than are available on a single plug and its cooperating block. In this case, two plugs 32 may be used, as shown in Fig. 8, and the switchboard opening 17 provided with two extension openings like the opening 17″ shown in Fig. 4, one for each plug. In order to prevent movement of the device from its normal switchboard position before the device is deenergized, each of the plugs 32 may overlap the flange of the casing 13. Cases may arise where it is desirable to prevent movement of the device from its normal switchboard position until connections to other devices are changed. In this case plugs 32′ may control these other connections through terminal blocks at the rear of the switchboard, the plugs and blocks being, for example, of the type disclosed in the aforesaid Letters Patent No. 1,718,529. The plugs 32′, however, will be arranged to overlap flanges 45 on the plugs 32 immediately above them. The plugs 32′ may also be provided with flanges 45 for interlocking with other plugs in case such is desired. Thus, with this arrangement the electro-responsive device cannot be moved from its normal switchboard position until every plug has been removed and, therefore, every connection broken.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States is:

1. In a switchboard mounting for electroresponsive apparatus provided with terminals, means insertable from the front of the switchboard through an opening therein for supporting said apparatus for movement to and from a normal switchboard position through the opening with the terminals of the apparatus at the rear of the switchboard, means operable from the front of the switchboard for securing said supporting means thereto, a terminal block mounted on the switchboard, a cooperating plug operable from the front of the switchboard to engage said block, and conducting means connecting the terminals of said apparatus and said plug movable through an opening in the switchboard upon movement of said apparatus through its switchboard opening.

2. In a switchboard mounting for an electroresponsive device provided with terminals, means for supporting said device for movement transversely to the switchboard through an opening therein to and from a normal switchboard position with the terminals of the device at the rear of the switchboard, a terminal block mounted on the switchboard, a cooperating plug operable from the front of the switchboard to engage said block, conducting means connecting the terminals of said device and said plug, and means for preventing movement of said device from its normal switchboard position while said plug is in cooperative engagement with said block, the construction and arrangement of parts being such that said device, supporting means, plug, and conducting means are removable as a unit from the front of said switchboard when said plug is disengaged from said block.

3. In a switchboard mounting for electroresponsive apparatus provided with terminals, means insertable from the front of the switchboard through an opening therein for supporting said apparatus for movement to and from a normal switchboard position through the opening with the terminals of the apparatus at the rear of the switchboard, means operable from the front of the switchboard for securing said supporting means thereto, a terminal block mounted on the switchboard, a cooperating plug operable from the front of the switchboard to engage said block, conducting means connecting the terminals of said apparatus and said plug movable through an opening in the switchboard upon movement of said apparatus through its switchboard opening, and means for preventing movement of the apparatus from its normal switchboard position while said plug is in cooperative engagement with said block.

4. In a switchboard mounting for electroresponsive apparatus provided with terminals, means insertable from the front of the switchboard through an opening therein, for supporting said apparatus for movement to and from a normal switchboard position through the opening with the terminals of the apparatus at the rear of the switchboard, means operable from the front of the switchboard for securing said supporting means thereto, a plurality of terminal blocks mounted on the switchboard, cooperating plugs operable from the front of the switchboard to engage the respective blocks, conducting means connecting the terminals of said apparatus and certain of said plugs movable through openings in the switchboard upon movement of said apparatus through its switchboard opening, and interlocking means between said plugs and between at least one of said plugs and said apparatus for preventing movement of the apparatus from its normal switchboard position while any of the plugs is in cooperative engagement with its respective block.

5. In a switchboard mounting for electrical devices, such as relays, meters and the like, a base for the device, terminals extending from the rear of said base, means insertable through an opening in the switchboard for supporting said base for movement to and from a normal switchboard position through the opening with said terminals to the rear of the switchboard, means operable from the front of the switchboard for securing said supporting means thereto, a terminal block mounted on the switchboard, a cooperating switch plug operable from the face of the switchboard to engage said block, and flexible conducting means connecting the terminals of said base and said plug movable through an opening in the switchboard upon movement of said base through its switchboard opening.

6. In a switchboard mounting for electrical devices, such as relays, meters and the like, a base for the device, terminals extending from the rear of said base, means insertable through an opening in the switchboard for supporting said base for movement to and from a normal switchboard position through the opening with said terminals to the rear of the switchboard, means operable from the front of the switchboard for securing said supporting means thereto, a terminal block mounted on the switchboard, a cooperating plug operable from the face of the switchboard to engage said block, flexible conducting means connecting the terminals of said base and said plug movable through the opening in the switchboard upon movement of said base through the opening, and interlocking means on said plug and said base for preventing movement of the base from its normal switchboard position while said plug is in cooperative engagement with said block.

7. A removable-from-the-front-of-the-switchboard-flush-mounting for an electroresponsive device comprising means for supporting the device for movement through an opening in the switchboard to and from a normal switchboard position with its face substantially flush with the front of the switchboard, means operable from the front of the switchboard for securing said supporting means thereto, a terminal block mounted on the switchboard, a cooperating plug operable from the front of the switchboard to engage said block, and flexible conducting means between said device and said plug movable through an opening in the switchboard upon movement of the device through its switchboard opening.

8. In combination, a switchboard having wiring at the rear thereof, an electroresponsive device having terminals, such as a relay, meter or the like, means insertable through an opening in the switchboard for supporting said device for movement through the opening to and from a normal switchboard position with said terminals at the rear of the swtichboard, means operable from the front of the switchboard for securing said supporting means thereto, and cooperating contact means conductively connected respectively to said terminals through said opening and to said wiring operable from the front of the switchboard for readily establishing and disestablishing electric current conducting connections between said device and the wiring at the rear of the switchboard.

9. In combination, mounting means, an electrical device, means insertable from one side of said mounting means through an opening therein for supporting said device for movement to and from a normal position on said mounting means through the opening therein, means operable from said one side of the mounting means for securing said supporting means thereto, a terminal block mounted on said mounting means, a cooperating plug operable from said one side of the mounting means to engage said block, and conducting means between said device and said plug movable through an opening in said mounting means.

10. In combination, mounting means, an electrical device, means insertable from one side of said mounting means through an opening therein for supporting said device for movement to and from a normal position on said mounting means through the opening therein, means operable from said one side of the mounting means for securing said supporting means thereto, a terminal block mounted on said mounting means, a cooperating plug operable from said one side of the mounting means to engage said block, conducting means between said device and said plug movable through an opening in said mounting means, and means for preventing movement of the device from its normal position while said plug is in cooperative engagement with said block.

11. In combination, mounting means having wiring at the rear thereof, an electrical device having terminals, means insertable through an opening in said mounting means for supporting said device for movement through the opening to and from a normal mounted position with said terminals at the rear of the mounting means, means operable from the front of the mounting means for securing said supporting means thereto, and cooperating contact means conductively connected respectively to said terminals through said opening and to said wiring operable from the front of the switchboard for readily establishing and disestablishing electric current conducting connections between said device and the wiring at the rear of the mounting means.

12. In combination, mounting means, an electrical device, and means insertable through an opening in the mounting means from one side thereof for supporting said device for movement through the opening to and from a normal mounted position and removable from the mounting means with the device as a unit comprising two relatively movable means one mounted on the device, and means operable from said one side of the mounting means for securing the other of said relatively movable means to the mounting means.

13. In combination, mounting means, an electrical device, and means insertable through an opening in the mounting means on one side thereof for supporting said device for movement through the opening to and from a normal mounted position and removable from the mounting means with the device as a unit comprising a support, means operable from one side of the mounting means for securing said support to the mounting means and operating means engageable with said support from said one side of the mounting means and comprising an operating member operable from said one side of the mounting means to effect movement of the device relatively to the mounting means.

14. In combination, mounting means having wiring at the rear thereof, an electrical device having terminals, means insertable through an opening in said mounting means for supporting said device for movement through the opening to and from a normal mounted position with said terminals at the rear of the mounting means and removable from the mounting means with the device as a unit, and cooperating contact means conductively connecting said terminals and said wiring operable from the front of the switchboard for readily establishing and disestablishing electric current conducting connections between said device and the wiring at the rear of the mounting means.

15. In combination, mounting means having wiring at the rear thereof, an electrical device having terminals, means insertable through an opening in said mounting means for supporting said device for movement through the opening to and from a normal mounted position with said terminals at the rear of the mounting means and removable from the mounting means with the device as a unit, and cooperating contact means conductively connecting said terminals and said wiring constructed and arranged to permit the ready withdrawal of said device and supporting means as a unit.

16. In combination, mounting means, a relay, means for supporting said relay for movement transversely of said mounting means to and from a normal position, and releasable means for preventing said transverse movement of the relay from the normal position comprising switching means operative to prevent a false circuit controlling operation of said relay during said transverse movement.

17. In combination, mounting means, a relay, means for supporting said relay for movement transversely of said mounting means to and from a normal position, releasable means for preventing said transverse movement of the relay from the normal position, and switching means operable in response to the releasing action of said releasable means to prevent a false circuit controlling operation of the relay during the transverse movement thereof.

CHARLES H. HILL.